June 6, 1972  J. E. BEESON  3,667,807
SHOULDER BELT RELEASABLE HOLDING MEANS
Filed April 10, 1969  2 Sheets-Sheet 2
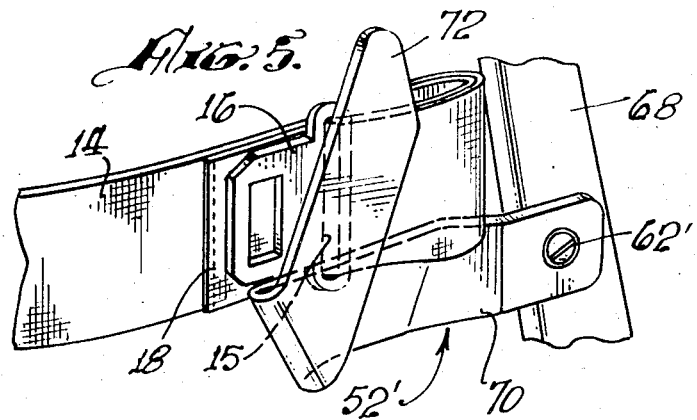
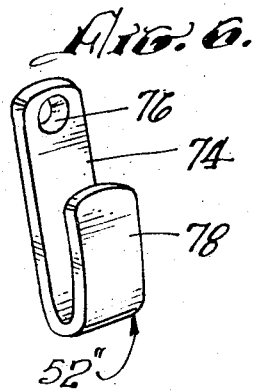
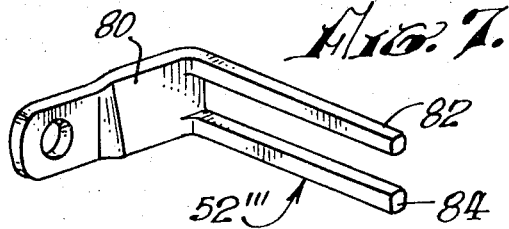
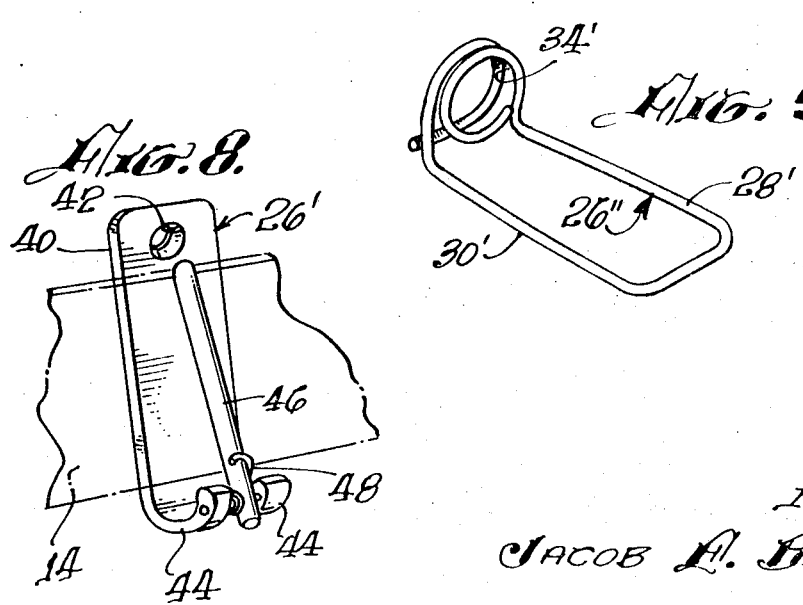
INVENTOR.
JACOB A. BEESON,
By
Huebner & Worrel
ATTORNEYS United States Patent Office 3,667,807
Patented June 6, 1972

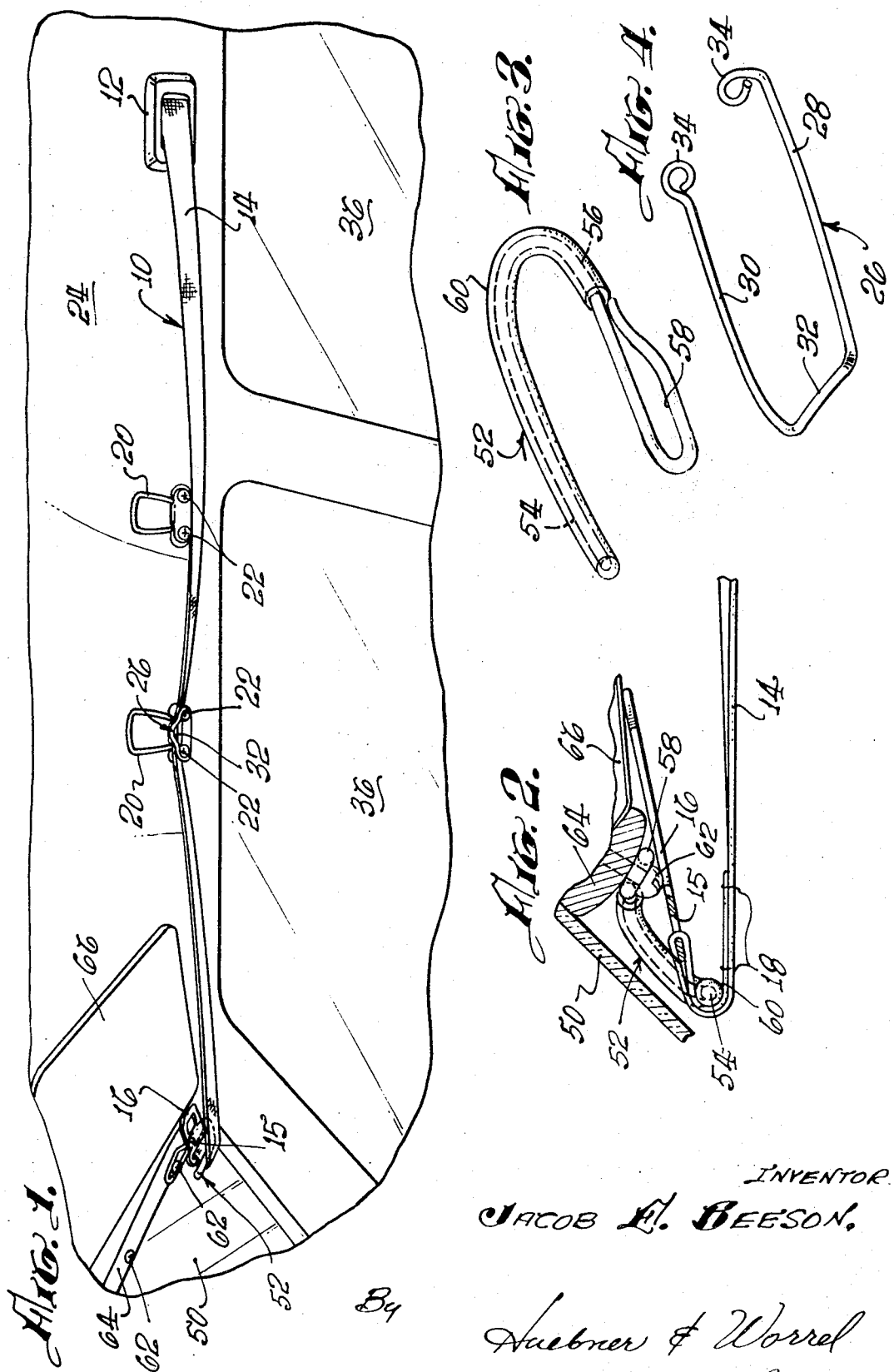

3,667,807
SHOULDER BELT RELEASABLE
HOLDING MEANS
Jacob E. Beeson, 943 Kingsley Drive,
Arcadia, Calif. 91006
Filed Apr. 10, 1970, Ser. No. 27,382
Int. Cl. A26b 35/00
U.S. Cl. 297—389
6 Claims

ABSTRACT OF THE DISCLOSURE

An automobile shoulder belt releasable holding means including retainer means mounted adjacent the windshield of a vehicle for releasably retaining the tongue end of said belt and maintaining the belt in a fully extended position of non-use ready for immediate release and use.

BACKGROUND OF THE INVENTION

Heretofore, conventional automobile shoulder belts when mounted in a vehicle, included one portion of said belt fixed to the upper frame structure of the vehicle and in order to maintain that portion of the belt out of position, brackets have been secured to the frame of the vehicle and the belt, forming several folds, is wedged between the bracket and the material headliner of the vehicle. When it is desired to use the belt it has been necessary to disengage the folds from the bracket which usually requires the use of two hands.

Further, to reposition the belt in its non-use position, great time and effort is necessary to refold the belt to assume its proper maintenance and neat appearance.

Because of the amount of time and the need for use of both hands to release the shoulder belt, it is quite often not utilized by the driver or a passenger in the front seat of an automobile, and thus increases the chances of serious injury during an automobile collision.

SUMMARY OF THE INVENTION

This invention relates to a shoulder belt releasable holding means wherein one portion of a shoulder belt secured to the upper frame structure of the automobile is maintained in a fully extended releasable position whereby it may be moved from this non-use position along the roof of the automobile by means of one hand grasping the tongue end of the belt, pulling it across the body and connecting it to the buckle portion of the shoulder belt.

There is included a support means wherein a portion of the belt may rest thereon and retainer means adjacent the windshield of the automobile, where the belt and tongue end portion may be looped thereover or retained thereby, wherein the disengagement of the tongue end from the retainer means is relatively simple and requires only one hand.

An advantage of this releasable holding means is that the support means and retainer means are adapted for use with any conventional automobile that is equipped with shoulder belts.

These and other advantages will become apparent from the following detailed description of the drawings.

BRIEF DESCRIPTION OF THE DRAWINGS

FIG. 1 is an environmental view of the poistion of an automobile shoulder belt along the roof of a vehicle wherein new and novel support means and retainer means are positioned to maintain the belt in such non-use;

FIG. 2 is a detailed partial sectional view of the retainer means in position adjacent the windshield of the vehicle;

FIG. 3 is a perspective view of one form of the retainer means illustrated in FIGS. 1 and 2;

FIG. 4 is a perspective view of one form of support means as illustrated in FIG. 1;

FIG. 5 is a modified form of retainer means which is mounted on the side frame or molding of the windshield;

FIG. 6 is a further modified retainer means mounted similar to the modified retainer means of FIG. 5;

FIG. 7 is a still further modified retainer means which is mounted on the side frame of an automobile windshield frame;

FIG. 8 is a modified support means; and

FIG. 9 is a modified support means specifically adapted for use in a Ford make of vehicle.

BRIEF DESCRIPTION OF THE PREFERRED EMBODIMENTS

In all vehicles sold today, it is mandatory by law that they be equipped with shoulder belts for use by the driver and the front seat passenger. Conventionally, a shoulder belt is in two portions, one portion of which is secured to the floor of the vehicle and extends between the seat cushion and back cushion terminating in a buckle. The other portion of the shoulder belt is secured to the upper frame structure of the vehicle normally rearwardly of the front seat and terminates in a metal tongue portion which is releasably lockable within the buckle portion after it is pulled around the body of the user.

This particular invention relates only to a releasable holding means to be utilized with that portion of the shoulder belt that is affixed to the upper frame structure of the vehicle.

There is illustrated in FIG. 1, a shoulder belt 10 including a frame 12 secured to the upper frame structure of the vehicle and having one end of an elongated web belt 14 secured therein. At the opposite end of the elongated web belt 14, there is provided a metallic tongue 16 which is to be interlocked in the buckle portion when the belt is in use. Preferably, the elongated web belt 14 is doubled over as viewed in FIG. 2 and inserted through a slot 15 in the tongue 16 and sewed or stitched as at 18 so that the tongue 16 is maintained at all times with the web belt 14.

In customary practice and usage, there is positioned ahead of the frame 12, conventional retainer clips 20 which are secured by screws 22 passing through a fabric headliner 24 into an upper frame structure, not illustrated, forming a part of the roof of the vehicle.

When the shoulder belt 10 is not in use, it is folded upon itself and vertically positioned between the conventional retainer clips 20 and the material headliner 24. Normally when the shoulder belt is in this conventional position, it is relatively difficult to remove from the conventional retainer clips 20 with one hand and when the belt is to be reinserted and maintained by the clips 20, it always requires two hands to neatly and properly fold the belt 10 so that it may be retained within the clips to prevent it from sagging below the roof of the vehicle.

With the advent of this invention, the shoulder belt 10 may be maintained in extended readiness for use with a mere release of the tongue 16 by the use of one hand. Also, when it is desired to remove the shoulder belt from the wearer, the belt may be repositioned, such as shown in FIG. 1, with relative ease.

In order to accomplish the desired results, there is provided a support means or bracket generally designated 26 which is U-shaped, including a pair of parallel legs 28 and 30 joined by a tie leg 32 as can be seen from FIG. 4. The respective legs 28 and 30 are preferably parallel and on the same plane whereas the tie leg 32, while joining the legs 28 and 30, is curved slightly upwardly forming a lip. At the ends of the legs 28 and 30 opposite the tie leg 32 there are provided a pair of screw eyes 34 through which the screws 22 of the conventional retainer clip 20 may be inserted. By positioning the support means 26 in the same spot where the clip 20 was positioned by the automobile manufacturer, the screw holes may be utilized. Because the screws 22 are of a sufficient length the support means 26 may be positioned on the clip 20 without the necessity of removing the clip 20.

When the support bracket 26 is positioned, it will extend normally horizontal and a portion of the elongated web belt 14 will rest thereon. With the tie leg 32 having an upturned lip, the belt will remain thereon even though when the vehicle is tilted from side to side when turning.

While there is only illustrated one support bracket 26 in FIG. 1, in additional support bracket may be utilized particularly where there is an extended distance between the frame 12 and the support bracket 26 where sagging might occur and the elongated web portion 14 would drop below the roof of the vehicle and either obscure the view from the side windows 36 or to prevent an untidy appearance of the interior of the automobile.

FIG. 8 illustrates a modified form of support bracket 26' which includes a rear plate 40 including a screw opening 42 and an outwardly extending bifurcated base portion 44. The base portion 44 being split is adapted to receive a bar 46 which is pivotally mounted therein and preferably there is a spring 48 which urges the bar against the rear plate 40.

When utilizing this type of modified support bracket 26', a screw passes through the opening 42 and secures the bracket to the upper frame structure of the vehicle and the elongated web portion 14 of the shoulder belt 10 is inserted between the rear plate 40 and the bar 46. When it is desired to remove the elongated web belt portion 14, it is merely pulled outwardly against the bar and the spring 48 is overcome so that the bar will extend to a horizontal position or as far as is necessary to release the web belt portion 14.

FIG. 9 illustrates a further modified support bracket 26" with a single eye 34' for use with the conventional retainers presently installed on the Ford make of vehicles.

Mounted adjacent the windshield 50 of the vehicle is a retainer means generally designated 52. The retainer means 52 is adapted to guide and brace the tongue portion 16 of the shoulder belt 10 so that the belt is maintained in the fully extended position illustrated in FIG. 1.

As best seen from FIG. 3, the retainer means 52 is generally U-shaped having a leg 54 and leg 56. The leg 56 is bent to form an elongated screw receiving eye 58. As can be seen from FIG. 3, insulation material 60 may cover the leg 54 to prevent rattling and damage to the tongue portion 16.

In order to properly mount the retainer means 52, one of the screws 62 which maintain the upper windshield molding 64 is unscrewed and inserted through the eye 58 so that the leg 56 is flush with the molding 64. With the elongated eye 58, proper lateral adjustment of the retainer means 52 may be had. As can be seen from FIGS. 1 and 2, the leg 54 of the retainer means 52 is below and inclined outwardly toward the windshield so that the belt may be raised as far as possible to prevent obstruction of the view through the windshield 50.

In order to utilize the retainer means 52, the web portion 14, after it has been laid upon the support 26, is looped around the leg 54, as best seen in FIG. 2, and the tongue portion bears against the sunvisor 66 or molding 64 depending on the length of the belt.

In FIGS. 5, 6 and 7 there are illustrated modified retaining means 52', 52", and 52'" which will retain the tongue portion and the belt in its extended position. The modification in FIG. 5 is preferably secured to the side molding 68 of the windshield by means of a set screw 62'. The retaining means 52' is a bracket having a horizontally rearward extending section 70 which is then bent outwardly and upwardly forming an angle or retaining section 72. In order to insert the belt, the portion 14 and the tongue portion 16 are bent upon themselves and inserted between the section 72 and the material liner of the roof of the vehicle. As can be seen, the modification of FIG. 5 will retain the web portion 14 in a generally vertical position, out of line with the windshield 50.

The modification of FIG. 6 shows a retainer means 52" which is in the form of a hook with a support leg 75 having a screw receiving opening 76 and the support leg 74 is bent upwardly forming the hook portion 78 wherein again the belt and tongue portions 14 and 16 may be inserted vertically and retained therein when the belt is in non-use.

The retainer means 52'" in FIG. 7 is somewhat similar to that illustrated in FIGS. 1 and 2, except again, the base portion 80 is secured to the side molding 68. Two parallel spaced apart legs 82 and 84 project normal to the plane of the base portion 80 so that the belt may be wrapped around the leg 84 in the space created between the respective legs 82 and 84.

Thus, it can be seen that with any of the apparatus above identified and described, it is merely a one hand operation to remove the belt 10 for use with a passenger or driver and when the belt is desired to be placed in non-use, it is again merely a one hand operation of inserting the web portion 14 on the support bracket 26 and looping the buckle 16 around the retainer means 52 for retaining the belt in the extended position as shown in FIG. 1.

Although I have herein shown and described my invention in what I have conceived to be the most practical and preferred embodiment, it is recognized that departures may be made therefrom within the scope of my invention.

What is claimed is:

1. Shoulder belt releasable holding means adapted to maintain one part of a two part shoulder belt in a non-use fully extended position within a vehicle wherein the part maintained includes one end permanently affixed to the upper frame structure of said vehicle, an elongated flexible belt portion extending forwardly from said securement and a free end terminating in a tongue member comprising retainer means mounted in said vehicle spaced forwardly of said secured end of said shoulder belt and secured to an interior windshield molding and adapted to releasably wedgingly maintain said free end including said tongue member whereby said one part of said two part shoulder belt in said non-use position is fully extended ready for immediate release and use with the other part of said two part shoulder belt.

2. Shoulder belt releasable holding means as defined in claim 1 wherein said retainer means includes a generally U-shaped member having parallel legs, and wherein one of said legs forms a bearing surface adapted to be engaged by said free end whereby said tongue is looped therearound and is releasably wedgingly maintained between said legs, and said other leg is fixed to an interior windshield molding.

3. Shoulder belt releasable holding means as defined in claim 2 wherein said leg forming said bearing surface extends on a general horizontal plane.

4. Shoulder belt releasable holding means as defined in claim 1 wherein said retainer means includes a base portion securable to said upper frame structure and having a pair of spaced apart parallel legs projecting normal to the plane of the base portion and into the path of said fully extended part of said two part shoulder belt, and adapted to wedgingly receive and maintain said fully extended part.

5. Shoulder belt releasable holding means as defined in claim 1 wherein said retainer means includes a vertically extending U-shaped bracket adapted to wedgingly maintain said free end in a vertical position.

6. Shoulder belt releasable holding means adapted to maintain one part of a two part shoulder belt in a non-use fully extended position within a vehicle wherein the part maintained includes one end permanently affixed to the upper frame structure of said vehicle, an elongated flexible belt portion extending forwardly from said securement and a free end terminating in a tongue member comprising: a retainer means including a generally U-shaped member having parallel legs, and wherein one of said legs forms a bearing surface adapted to be engaged by said free end of said part whereby said tongue is loped therearound and is releasably wedgingly maintained between said legs, and said other leg is fixed to an interior windshield molding of said vehicle, and wherein there is provided support means mounted on said upper frame structure of said vehicle between said retainer means and said securement of said shoulder belt and adapted to receive and support at least a portion of said elongated fully extended flexible seat belt in such non-use position.

References Cited

UNITED STATES PATENTS

| | | | |
|---|---|---|---|
| 3,532,380 | 10/1970 | Struder et al. | 280—150 SB |
| 2,936,148 | 5/1960 | Gralewicz | 248—303 |

FOREIGN PATENTS

| | | | |
|---|---|---|---|
| 562,939 | 7/1944 | Great Britain | 248—303 |
| 643,027 | 9/1950 | Great Britain | 248—304 |

JAMES T. McCALL, Primary Examiner

U.S. Cl. X.R.

280—150 SB; 297 385